United States Patent
Coleman et al.

(10) Patent No.: US 11,039,618 B2
(45) Date of Patent: Jun. 22, 2021

(54) METAM SALTS AND POLYSULFIDE SOIL TREATMENT

(71) Applicant: Tessenderlo Kerley, Inc, Phoenix, AZ (US)

(72) Inventors: Kyle England Coleman, Kennewick, WA (US); Michael Massoud Hojjatie, Tucson, AZ (US); Bernard Oscar Olsen, Paso Robles, CA (US); Kurt Carl Volker, Yakima, WA (US)

(73) Assignee: Tessenderlo Kerley, Inc., Phoenix, AZ (US)

( * ) Notice: Subject to any disclaimer, the term of this patent is extended or adjusted under 35 U.S.C. 154(b) by 40 days.

(21) Appl. No.: 15/683,601

(22) Filed: Aug. 22, 2017

(65) Prior Publication Data
US 2018/0049441 A1 Feb. 22, 2018

Related U.S. Application Data

(60) Provisional application No. 62/378,071, filed on Aug. 22, 2016.

(51) Int. Cl.
| | |
|---|---|
| *A01N 59/06* | (2006.01) |
| *A01N 59/02* | (2006.01) |
| *A01N 25/02* | (2006.01) |
| *A01N 25/18* | (2006.01) |
| *A01N 47/14* | (2006.01) |
| *A01N 47/12* | (2006.01) |

(52) U.S. Cl.
CPC ............ *A01N 59/06* (2013.01); *A01N 25/02* (2013.01); *A01N 25/18* (2013.01); *A01N 47/12* (2013.01); *A01N 47/14* (2013.01); *A01N 59/02* (2013.01)

(58) Field of Classification Search
None
See application file for complete search history.

(56) References Cited

U.S. PATENT DOCUMENTS

| | | |
|---|---|---|
| 2,797,181 A | 6/1957 | Drexel |
| 3,030,263 A | 4/1962 | Zeile et al. |
| 4,243,563 A | 1/1981 | Ferm |
| 4,994,487 A | 2/1991 | Haglund |
| 6,589,916 B1 | 7/2003 | Feiler et al. |
| 7,666,309 B1 * | 2/2010 | Baker ............ C02F 5/083 111/118 |
| 8,642,506 B2 * | 2/2014 | Sakurai ............ A01N 43/56 504/100 |

FOREIGN PATENT DOCUMENTS

| | | |
|---|---|---|
| CN | 106719732 A | 5/2017 |
| CN | 107535262 A | 1/2018 |
| WO | WO/1997/00857 | 9/1997 |

OTHER PUBLICATIONS

European Commission Health & Consumers Directorate-General, Review report for the active substance metam, pp. 1-5, Appendix I, pp. 1,2, Appendix II, pp. 1,2. (Year: 2012).*
Extension Pesticide Program, Soil Fumigation, pp. 1-25. (Year: 2010).*
PCT International Search Report and Written Opinion for PCT/US2017/048079, dated Nov. 13, 2017, 12 pages.
"Universal Vapam Material Safety Data Sheet", Universal Crop Protection (pty) Ltd., May 1, 2011 (May 1, 2011), pp. 1-5, XP55578175, South Africa, Retrieved from the Internet: URL:http://www.villacrop.co.za/files/Vapam_UCP_MSDS.pdf [retrieved on Apr. 5, 2019].
Database WPI, Week 201748, Thomson Scientific, London, GB; AN 2017-37221V, XP002790363 & CN 106,719,732 A (Guangxi Letu Biotechnology Co Ltd) May 31, 2017.
Database WPI, Week 201811, Thomson Scientific, London, GB; AN 2018-02909N, XP002790358 & CN 107,535,262 A (Yunnan Tongbang Agric Dev Co Ltd) Jan. 5, 2018.
PCT International Search Report and Written Opinion for PCT/US2019/018782, dated Apr. 24, 2019, 16 pages.
William M. Draper et al: "Rate constants for metam-sodium cleavage and photodecomposition in water", Journal of Agricultural and Food Chemistry, vol. 41, No. 7, Jul. 1, 1993 (Jul. 1, 1993), pp. 1129-1133, XP55578115, US, ISSN: 0021-8561, DOI: 10.1021/jf00031a023.

* cited by examiner

*Primary Examiner* — Alton N Pryor
(74) *Attorney, Agent, or Firm* — Fennemore, P.C.

(57) ABSTRACT

A stable concentrated solution of a metam salt and a polysulfide, particularly calcium polysulfide, can be used to treat for soil pathogens, including the pathogen responsible for potato early die. Calcium polysulfide alone in sufficient concentration and dosage provides activity against the same pathogen. It is believed that the high concentrations of the compounds, that is, the high concentration of lime sulfur admixed with a metam, results in lower rates of degradation that result from calcareous soil, increased soil adsorption or retention, and improved distribution of metam or methyl isothiocyanate (MITC) in the soil.

20 Claims, No Drawings

METAM SALTS AND POLYSULFIDE SOIL TREATMENT

PRIORITY

This application claims priority to U.S. Provisional application No. 62/378,071 titled METAM SALTS AND POLYSULFIDE SOIL TREATMENT, filed on Aug. 22, 2016, the contents of which are incorporated herein for all legal purposes.

FIELD OF THE INVENTION

The invention relates to a stable concentrated solution of a fumigant and an inorganic polysulfide compound, wherein said polysulfide is preferably calcium polysulfide, and wherein said fumigant is preferably an alkali salt of metam. The invention also relates to treating soil, particularly soil to be used for growing root, tuber and bulb vegetable crops, cucurbits, fruiting vegetables, small fruit and strawberries, with the concentrated solution of a fumigant and an inorganic polysulfide compound. Another aspect of the invention is treating soil to be used for growing root, tuber and bulb vegetable crops, cucurbits, fruiting vegetables, small fruit and strawberries, with concentrated solutions of calcium polysulfide in amounts greater than 122 pounds per acre (137 Kg/ha) of calcium polysulfide. Advantageously the calcium polysulfide is incorporated into the soil as a concentrated solution, and the treatment is incorporated into or displaced down to a depth of 4 inches or more, for example 8 inches or more.

BACKGROUND OF THE INVENTION

Root and bulb vegetable crops such as carrots, onions, potatoes and other root/tuber vegetables are particularly subject to attack by various soil-borne pathogens. Potatoes in particular are an important crop subject to attack from the pathogen *Verticillium dahliae* ("Vert", "*V. dahlia*," or "Verticillium") also known as Verticillium wilt and as potato early die. Verticillium wilt of potato occurs wherever potatoes are grown. Yields of potatoes grown in infested soils may be 30-50% lower than yields on non-infested land. In some varieties, the discoloration of the vascular tissue in tubers results in tuber quality reduction.

*Phytophthora infestans* causes Late Blight and attacks both tubers and foliage. Control of late blight is reliant on multiple applications of fungicide during the growing season. Some areas have such infection pressure they may require 10+ fungicide applications for control of late blight. Rotation of fungicides is very important to avoid development of resistance although there are some standard fungicides that have been used consistently for years/decades. Late blight also attacks tomatoes.

*Verticillium* wilt, caused by *Verticillium dahliae* and *Verticillium alboatrum*, affects many plant species including herbaceous annuals (for example potato), perennials (for example peppermint), and woody species (for example maple). Other examples of susceptible crops include cabbage, celery, cucumber, eggplant, lettuce, melons, pepper, potato, pumpkin, radish, rhubarb, and tomato. The pathogens can persist in soil for many years in the absence of a susceptible crop. Infection is through the roots, and therefore treatment of the disease is difficult. *Verticillium* propagules occur in highest concentration in the top 12 inches of the soil, but can reside at depths as low as 16 inches. Crop rotation does not control the pathogen because the microsclerotia persist in soil for years. Planting non-susceptible crops for several consecutive seasons does not lead to significant reductions in the populations of microsclerotia.

Application of soil fumigants to the soil profile provides effective control in many soils. Fumigants are typically applied through either shank injectors or irrigation systems in either the fall or the spring. Fumigants to suppress and/or control soil-borne pests may be applied by chemigation, soil injection or soil bedding equipment as is known in the art. Application is typically at depths of 8 inches to 18 inches below the surface of the ground. When injected, the soil is sometimes covered with plastic to prevent volatilization of the fumigant. Depending upon the chemical, rate, and environmental conditions at time of application, reduction in soil populations have ranged from 85-95%. Fumigation rates need to be high when soil populations of *Verticillium* are large or when populations need to be reduced for many years, for example with orchards and certain nut trees.

As various fumigants have been increasingly restricted due to outgassing and deleterious effects with ozone, other fumigants such as 1,3-dichloropropene (1,3-D), chloropicrin (CP) and methyl isothiocyanate (MITC) generators (metam sodium or dazomet) have seen increasing use. In addition to direct toxicity, some fumigants are also regulated as volatile organic compounds. The purpose of fumigation is to achieve maximum control of soilborne pests, which requires an effective concentration or exposure duration and the uniform distribution of fumigants in soil. Soil fumigants, such as dithiocarbamates, including especially sodium methyldithiocarbamate (sodium metam) and potassium N-methyldithiocarbamate (metam potassium), are routinely used by growers to control various pests including *Verticillium dahliae*. There is a custom of calling sodium salts of metam "metam sodium" but the custom is not as prevalent for the potassium salts. As used herein, metam sodium is synonymous with sodium metam, and so on for other salts.

Liquid metam sodium is typically sold commercially as about a 42% by weight aqueous solution, having about 4.25 pounds active ingredient per gallon (505 g/L), though the concentration can vary depending on manufacturer. Liquid potassium metam is commercially available at higher concentrations, nearly 54% or 56% by weight solution. Combination formulations are available, generally containing between 42% and 56% by weight of mixed alkali salts of metam. While it is of course possible to use more dilute product, use of concentrated product is preferred so long as the product is stable and can be dispersed into soil using standard existing equipment.

Current fumigation application techniques include broadcast fumigation and chemigation. With standard broadcast fumigation, fumigants are applied directly to the soil at a certain depth using conventional equipment or rigs (shanks). Fumigants must be added below the soil surface, that is, injectors must be placed below the soil surface before product flow begins. Chemigation is injecting fumigants into soil with irrigation water through nozzles or drip tapes. These injected solutions typically are dilute so that movement of water away from injection nozzles moves the fumigant through the soil. Generally, dilution with irrigation water is in the range of between 500 gallons water to one gallon liquid metam to about 10000 gallons water to one gallon liquid metam, more typically between 1000 gallons water to one gallon liquid metam to about 5000 gallons water to one gallon liquid metam, often about 2000 gallons water to one gallon liquid metam to about 4000 gallons water to one gallon liquid metam.

Metam is a commonly used fumigant. Metam is rapidly converted to MITC in soil, and MITC is volatile, readily evaporates and does not pose groundwater concerns. Metam's primary use is for soilborne disease suppression in potatoes, carrots, onions, tomatoes and other crops. A side benefit is some weed control, because metam or its reaction products are toxic when applied. A typical treatment rate for soils facing significant disease pressure is about 40 gallons of metam sodium per acre (190 Kg/ha of active ingredient). At commercial conditions this treatment will reduce certain soilborne disease by ~70%. In calcareous soils and in certain other soil types, efficacy tends to be lower. High calcareous areas include parts of California, Florida, Idaho, Washington and Nevada. Areas high in clay content and high disease pressure include North Dakota. Secondary uses are nematode and weed suppression. Ground applications favor nematode suppression while chemigation favors disease suppression, primarily due to the location of the pests.

Issues with organic fumigants are many. Most fumigants carry "harmful if exposed" terminology of their label. Exposure can occur during application or even after application as fumigant leaves the soil. Outgassing to atmosphere is a health concern and also results in fumigant loss. There are numerous methods to try to keep fumigant in the soil for a few days, including using tarps, overwatering to form water barriers, and the like. Additionally, before application of fumigant the soil must be shown to have sufficient moisture. Use of fumigants can be expensive, in part because of high use rates required in certain areas. For example, 42% metam is labeled for use rates up to 75 gallons per acre (701.61/ha). Further, use of certain fumigants is not permitted in organically labeled produce. Dispersion and mixing into soil is difficult. Finally, the efficacy of fumigants is reduced in certain soil-types, and certain materials in certain soils can degrade or deactivate a portion of the fumigant. For example, certain classes of fumigants, including metam, are less effective against pests in highly calcareous soil.

To reduce emission of fumigants from soil, overwatering is typically used. Chemicals have been used in the overwatering to help further reduce emissions. Halogenated fumigants are among the most heavily used pesticides in agriculture. Because of their high mobility and toxicological characteristics, the contamination of air or groundwater by certain of these compounds has been a great environmental concern. Reaction of such fumigants with polysulfides was found to result in rapid dehalogenation of several halogenated fumigants. For example, the reaction of polysulfides and methyl iodide (MeI), 1,3-dichloropropene (1,3-D), and chloropicrin (CP) was very rapid. Given the high reactivity of polysulfide salts toward those certain halogenated fumigants, this reaction is used as a pollution mitigation strategy, such as for disposal of fumigant wastes, treatment of fumigant-containing wastewater, and cleanup of fumigant residues in environmental media. In "Methods evaluated to minimize emissions from preplant soil fumigation," S. Gao, et al, California Agriculture 65(1):41-46, January-March 2011, the authors suggested overwatering with water and chemicals. Generally, for bare-soil fumigation, emissions from subsurface drip application are lower than broadcast-shank injections. This is attributed to increasing soil water content decreases vapor diffusion and increases the amount of fumigant partitioning in the aqueous phase, and there are no shank traces (i.e., soil fractures) that can serve as volatilization channels. But substantially higher soil water content would reduce the fumigant's distribution in soils by reducing vapor diffusion, reducing efficacy. Good efficacy can only be ensured when the fumigant moves with applied water for a relatively uniform distribution.

Soil amendments with chemicals such as ammonium or potassium thiosulfate, thiourea or certain polysulfides sprayed over soil surface are effective in reducing emissions with certain types of fumigants. These chemicals, which are sprayed or dripped in very low concentrations, less than 1% and typically less than 0.2% by weight, can react with fumigants to form nonvolatile compounds by dehalogenation. This would, of course, deactivate the fumigant. "Dechlorination of Chloropicrin and 1,3-Dichloropropene by Hydrogen Sulfide Species: Redox and Nucleophilic Substitution Reactions," W. Zheng et al, J. Agric. Food Chem., 2006, 54 (6), pp 2280-2287, stated that chlorinated fumigants chloropicrin (trichloronitromethane) and 1,3-dichloropropene (1,3-D) react rapidly with hydrogen sulfide species ($H_2S$ and HS—).

Irrigation with sprinklers forms a water seal, which minimizes emissions after fumigation. A high water content in the surface soil has been shown to provide an effective barrier to 1,3-D movement. Intermittent water seals following soil fumigation have been effective in reducing emissions of MITC. When irrigation stops, however, the emission flux tends to increase, depending on fumigant concentrations in the soil. As a result, cumulative or total emission losses may not be reduced as substantially as the peak flux. Reducing the peak flux is important because it lowers the potential exposure risk to workers and bystanders. Buffer zones are determined based on the peak emission flux. More frequent water applications are more efficient in reducing emissions than fewer applications with large amounts of water. But the high water content in surface soil can reduce the efficacy of a fumigant to control nematodes near the surface and to control weeds.

U.S. Pat. No. 7,666,309 describes using diluted calcium polysulfide in irrigation drips. The patent relates only to dilute solutions, where the polysulfide content is 1% or less. The patent states that calcium precipitation in irrigation equipment, especially in nozzles, results in plugging. This patent suggested adding an alkali sulfide as a precipitation preventing compound to the water to reduce precipitation. U.S. Pat. No. 7,666,309 went on to state "It has also been found that sodium methyldithiocarbamate can be contacted with a calcium polysulfide solution containing an effective amount of the precipitation preventing compound and without substantial precipitation. The sodium methyldithiocarbamate can be injected into an irrigation water stream after injection of the precipitation preventing compound, either before or after injection of calcium polysulfide, to prevent precipitation of the sodium methyldithiocarbamate. Alternatively, the sodium methyldithiocarbamate can be added to an aqueous solution of calcium polysulfide containing an effective amount of the precipitation preventing compound."

Lime sulfur (a mixture of calcium polysulfides) will kill certain fungi and insects when applied to apple trees. Spraying a dilute aqueous solution in an orchard is fairly common. Calcium polysulfide (CPS, or alternatively CaPS) is used in horticulture to control bark inhabiting microbial and insect pests. Labels warn not to apply more than 30 gallons of this product/acre/year to any crop listed on this label. See, for example, the NovaSource® Lime-Sulfur Solution™ Agricultural Fungicide. Lime Sulfur Solution™ (LSS, or "liquid lime sulfur") is a calcium polysulfide-based solution available from Tessenderlo Kerley Inc. and is currently registered to control powdery mildew in grapes, and is labeled in many States as a tool for apple blossom thinning. Large quantities of liquid lime sulfur are known to be applied to established trees as a foliar spray. Such sprays are applied in a manner to minimize the amount reaching the ground. Lime sulfur is also known as a soil additive useful as an acidifying agent. Applied to soil, CPS is also known to buffer soil pH, enhance sulfur fertilization and optimize nitrogen utilization of crops. A commercial product is SOIL-MEND™ available from Tessenderlo Kerley. Application rates are: for alkaline soil correction and improvement of water penetration, 10 gallons of SOIL-MEND™ per acre in irrigation water on growing plants; for preplanting treatment, use 20 to 30 gallons of SOIL-MEND™ per acre in irrigation water; and for preplant treatment of soil use ½ to ¾ gallons of SOIL-MEND™ per 1,000 square feet in irrigation water. 30 gallons per acre of this product is equivalent to 90 pounds of calcium polysulfide per acre (101 Kg calcium polysulfide/ha). Three fourths of a gallon per 1000 square feet of this product is equivalent to 32 pounds of calcium polysulfide per acre (37 Kg calcium polysulfide/ha). SOIL-MEND™ polysulfide is labeled to condition soil, and is limited to between 20 and 30 gallons per acre in preplant. This is 60 to 90 pounds of calcium sulfide per acre.

Liquid ammonia (ammonium) polysulfide was available as APS-600™ from Tessenderlo Kerley Inc. at an approximately 60% by weight solution, where the label says to apply in irrigation water or that APS-600 when diluted with water to 15% or lower nitrogen assay may be applied to soil. Application rates are 10 to 15 gallons per acre. This formulation contains 3.76 pounds of sulfur (in polysulfide) and 1.88 pounds of amoniacal nitrogen per gallon. Nitro-Sul™ ammonium polysulfide solution available from Tessenderlo Kerley states the maximum annual application rate is 60 gal/acre.

SUMMARY OF THE INVENTION

In one embodiment the invention is a stable concentrated solution of a dithiocarbamate fumigant and an inorganic polysulfide compound, said polysulfide preferably calcium polysulfide and said fumigant preferably a dithiocarbamate fumigant, wherein the concentrated solution comprises at least 2% by weight calcium polysulfide and at least 0.5% of fumigant, which may be an alkali salt of a fumigant, more preferably greater than 5% by weight of calcium polysulfide and greater than 2% by weight of the fumigant, for example wherein each of the dithiocarbamate fumigant and a polysulfide is present in the concentrated solution in an amount 3% by weight or greater, 4% by weight or greater, 6% by weight or greater, or 10% by weight or greater. The dithiocarbamate is preferably a salt of methyldithiocarbamate, for example an alkali salt. We found that in concentrated solutions, as described herein, metam is not reactive to certain inorganic polysulfides, preferably alkaline earth polysulfides, for example calcium polysulfide, and those polysulfides are not reactive to metam Further, the combination of fumigant and the polysulfide aids both penetration of the fumigant into soil and suppresses adverse reactions between certain soil types and the fumigants. The invention also relates to treating soil pathogens (fungi, bacteria, and nematodes) with the concentrated solution, advantageously comprising or consisting essentially of a fumigant and an inorganic polysulfide, for example a dithiocarbamate fumigant and an alkaline earth polysulfide, said polysulfide preferably comprising or consisting essentially of a calcium polysulfide (also known as "lime sulfur"), and said dithiocarbamate preferably comprising or consisting essentially of an alkali salt of methyldithiocarbamate. It is believed that the high concentrations of the compounds, that is, the high concentration of lime sulfur admixed with a metam, more particularly the concentration of lime sulfur, results in lower rates of degradation, increased soil adsorption or retention, and improved distribution of metam or methyl isothiocyanate (MITC) in the soil.

The invention is believed to be useful with a number of other fumigants and soil insecticides/pesticides, including those fumigants disclosed in WO 1997000857, allyl isothiocyanate, Oxamyl [Methyl N'N'-dimethyl-N-[(methylcarbamoyl)oxy]-1-thiooxamimidate], penthiopyrad, fluopyram N-[2-[3-chloro-5-(trifluoromethyl)-2-pyridinyl]ethyl]-2-(trifluoromethyl)benzamide with or without imidacloprid, methyl bromide, ethanedinitrile, fluensulfone: 5-chloro-2 (3,4,4-trifluoro-but-3-ene-1-sulfonyl)-thiazole, dimethyl disulfide, and calcium phosphide. The invention would be useful with 1,3-dichloropropene and chloropicrin if the fumigant is stabilized.

The invention also relates to treating soil for soil pathogens, including fungi, bacteria, and nematodes, for example the lists of diseases that can be found on the label for metam, said soil to be used to grow vegetables, especially tuber and bulb vegetables, but also including leafy vegetables and fruiting vegetables, and small fruit such as strawberries, or tomatoes, that are susceptible to *Verticillium* wilt and other listed diseases, including for example *Pythium* on carrots. Other examples of susceptible crops include cabbage, celery, cucumber, eggplant, lettuce, melons, pepper, potato, pumpkin, radish, rhubarb, peanut, and tomato. Treating is accomplished by applying to the subsurface of the soil the concentrated solutions described above and herein, and/or applying a slightly diluted solution of this invention. By slightly diluted we mean for example diluting the concentrate by a factor of for example 10:1 with water, or for example diluting but keeping calcium polysulfide concentrations above 1%. The treatment is most beneficial when the concentration of the polysulfide solution contacting pests is high, for example greater than 1%, more typically greater than 2%, for example greater than 3%, 4% or 5% by weight. These values include dilution by moisture in soil. Said treatment is especially beneficial for treating soil used for growing root and bulb vegetables and especially potatoes, as well as and tomatoes berries and small fruit as well as fruiting vegetables, wherein the treatment is applied before the vegetables or fruit are planted, or simultaneous with planting if seeds are resistant to the fumigant and resistant to the polysulfide. Preferred treatment time is pre-planting, before crops or seeds are put into the soil.

In another embodiment of the invention, a stable concentrated pre-mix solution as described in the paragraphs above is used to treat arable soil, wherein the solution is added to irrigation water or in a holding vessel with water at low dosage, that is, above less than about 1% by weight of polysulfides in the treatment water. The alkalinity in the metam, typically present as alkali hydroxides, will typically buffer the irrigation water solution and prevent precipitation (blooming) provided the carbonate concentration in the water is low. Advantageously the solution thus prepared is free from added alkali sulfides, which are an immediate health concern.

The invention also relates to treating soil pathogens by adding, to the subsurface of the soil to be used for growing vegetables and small fruit plants such as strawberries and tomatoes, a stable concentrated solution of an ammonium, alkali, or alkaline earth polysulfide, preferably comprising or consisting essentially of calcium polysulfide. This aspect of the invention more particularly relates to a method of treating soil for soil pathogens, particularly for treating fields where crop may be infected by the soil pathogens such as *Verticillium dahliae* (also known as potato early die) and *Phytophthora infestans*, comprising treating the subsurface of the soil with a concentrated aqueous solution of lime sulfur. Unlike fumigants, however, lime sulfur has very limited mobility in soil and is advantageously applied in a manner to maximize contact with the sub-surface pathogens over the soil profile depth of interest. The concentration of the Lime Sulfur Solution™ and treatment rate in pounds of calcium polysulfide per acre are higher than is normally used in drip irrigation and as soil amendment treatments. The treatment rates are preferably over 40 gallons as liquid lime sulfur per acre (123 pound per acre or 138 kg/ha as calcium polysulfide). Preferred rates are at least 45 gallons per acre, more preferably at least 50 gallons per acre, for example at least 60 gallons per acre, or at least 80 gallons per acre, for example at least 100 gallons per acre, where the liquid lime sulfur has a density of 10.5 pounds per gallon and is about 29% by weight calcium polysulfide. These rates correspond to calcium polysulfide applied at a rate of at least 138 pound per acre, more preferably at least 153 pounds per acre, for example at least 184 pounds per acre, or at least 246 pounds per acre, for example at least 307 pounds per acre. These rates also correspond to calcium polysulfide applied at a rate of at least 155 Kg/ha, more preferably at least 172 Kg/ha, for example at least 206 Kg/ha, or at least 275 Kg/ha, for example at least 344 Kg/ha. Treatment rates are the same with other polysulfides.

As used herein, when an application rate of liquid lime sulfur (aqueous calcium polysulfide) is expressed as gallons per acre, it is understood that a gallon contains 3.07 pounds of calcium polysulfide per gallon, and one gal liquid lime sulfur per acre is equivalent to 3.44 kg calcium polysulfide/ha. As used herein, the phrases "liquid lime sulfur," "lime sulfur solution," "LSS", and "LLS" are used interchangeably. As used herein, when an application rate of metam sodium is expressed as gallons per acre, it is understood that a gallon contains 4.25 pounds of sodium methyldithiocarbamate per gallon, and one gal./acre sodium metam solution such as Sectagon®-42 is equivalent to 4.76 kg/ha of metam sodium. As used herein, when an application rate of potassium metam is expressed as gallons per acre, it is understood that a gallon contains 5.63 pounds of potassium methyldithiocarbamate per gallon, and one gal/acre potassium metam solution such as Sectagon®-54 is equivalent to 6.3 kg/ha of potassium methyldithiocarbamate. Various fumigants are used at different rates and have different molecular weights, but it is well within the skill of the practitioner to adjust weights of the fumigant to account for these issues.

In preferred embodiments of the invention, the calcium polysulfide and the salt of metam are applied as a single mixed solution, to ensure that the benefits of the mixture are achieved. Applying as two separate mixtures runs a risk of having insufficient mixing and distribution, resulting in volumes of soil that are deficient is one ingredient or the other, which would suppress several advantages of the invention.

An aspect of the invention is a stable concentrated premix solution of an ammonium-, alkali-, or alkaline earth polysulfide, preferably comprising liquid lime sulfur (aqueous calcium polysulfide, CAS No 1344-81-6), and a polysulfide-stable fumigant or fumigants, including for example methyl isothiocyanate (MITC) generating fumigants preferably a metam, wherein said solution is shelf stable and can be applied to the subsurface of soil using existing equipment used in the art. Advantageously the weight ratio of the salt of metam to the inorganic polysulfide range from 20:1 to 1:20, for example between 10:1 and 1:10, or 4:1 and 1:4, or between 2:1 and 1:2, or between 3:1 and 1:3, or other ranges using the above range endpoints, such as for example 2:1 to 1:10. Preferred weight ratios are about 1 part polysulfide to between about 0.3 to 5 parts fumigant. Advantageously the polysulfides are primarily, greater than 50% of total polysulfides, calcium polysulfide. In some embodiments the inorganic polysulfides are at least 50% by weight calcium polysulfide, more preferably at least 80% calcium polysulfide, for example at least 95% by weight calcium polysulfide. Pure commercial grade calcium polysulfide solution is preferred. In preferred embodiments the concentrated solution contains a total of at least 1 pound per gallon, preferably at least 2 pounds per gallon (240 g/L), and in most preferred embodiments at least 2.5 pounds per gallon (300 g/L) total of polysulfide and methyl isothiocyanate (MITC) generating fumigants. Advantageously the polysulfide comprises, consists essentially, or alternatively consists of calcium polysulfide. Advantageously the methyl isothiocyanate (MITC) generating fumigants comprises, consists essentially, or alternatively consists of metam sodium, potassium metam, or mixture thereof. The solution can optionally contain added stabilizers, antifreeze agents, wetting agents, and penetrating agents.

The invention relates to a stable concentrated solution of a dithiocarbamate fumigant, preferably comprising or consisting essentially of an MITC generator, and an inorganic polysulfide, said inorganic polysulfide preferably comprising or consisting essentially of a calcium polysulfide, wherein the concentrated solution comprises at least 2% by weight calcium polysulfide and at least 0.5% of an alkali salt or salts of a dithiocarbamate fumigant, more preferably greater than 5% by weight of calcium polysulfide and greater than 2% by weight of the dithiocarbamate, for example wherein each of the dithiocarbamate fumigant and a polysulfide is present in the concentrated solution in an amount 4% by weight or greater. The preferred concentration of the solution of calcium polysulfide and salts of metam (sodium or potassium), called collectively "active ingredients" here, are at least 2 pounds of active ingredients per gallon (240 g/L), more preferably at least 2.5 pounds of active ingredients per gallon (300 g/L), more preferably at least 2.75 pounds of active ingredients per gallon (330 g/L). A practical maximum is about 5 pounds of active ingredients per gallon (less than 600 g/L).

The dithiocarbamate is preferably an alkaline salt of methyldithiocarbamate. Alkaline earth or ammonium methyldithiocarbamate, for example calcium salt, can also be used, though it is not preferred. The polysulfide can be one or more of calcium polysulfide, barium polysulfide, ammonium polysulfide, calcium polysulfide, potassium polysulfide, and sodium polysulfide. Of these, calcium polysulfide and potassium polysulfide are preferred, with calcium polysulfide being most preferred. Advantageously in one embodiment the treating solution comprises or consists essentially of at least 2% by weight polysulfide, preferably calcium polysulfide, and at least 0.5% of a salt of a dithiocarbamate fumigant. More preferably the treating solution comprises greater than 5% by weight of polysulfide and greater than 2% by weight of the fumigant. In one aspect the fumigant is a salt of metam, and the concentration of the salt of metam and the concentration of the polysulfide, preferably comprising or consisting essentially of calcium polysulfide, in the concentrated solution are each greater than about 5% by weight, for example greater than 8% by weight, or alternatively greater than 12% by weight. The concentrated solution is used to treat arable soil to inhibit soil pathogens. It is believed that the high concentrations of the compounds, that is, the high concentration of lime sulfur admixed with a metam, results in lower rates of degradation, increased soil penetration and retention, and improved distribution of metam or methyl isothiocyanate (MITC) in the soil. Further, the calcium polysulfide is pesticidal, though in mixtures with metam the toxicity of the calcium polysulfide may be dwarfed by the toxicity of the metam, depending on the ratios used.

Another aspect of the invention is a stable concentrated pre-mix solution of an ammonium-, alkali-, or alkaline earth polysulfide, preferably comprising liquid lime sulfur (aqueous calcium polysulfide, CAS No 1344-81-6), and a metam, wherein said solution is shelf stable and can be applied to the subsurface of soil using existing equipment used in the art. Advantageously the concentration of the salt of metam and the concentration of the polysulfide are each greater than 3% by weight or greater than 5% by weight, for example greater than 8% by weight, and in most preferred cases greater than 12% by weight. Advantageously the weight ratio of the salt of metam to the inorganic polysulfide range from 20:1 to 1:20, for example between 10:1 and 1:10, or 4:1 and 1:4, or between 2:1 and 1:2, or other ranges using the above range endpoints, such as for example 2:1 to 1:10. The amount of polysulfide in a concentrated solution of fumigant can vary, with less polysulfide needed when treating soils not containing large amounts of alkaline deposits and clays. A useful concentration can be as little as 4% 4% by weight calcium polysulfide in a solution of 30% or more of a salt of metam can improve the performance of the metam.

The invention also relates to stable concentrated solutions of inorganic polysulfides and MITC-generating fumigants. The invention also relates to treating soil for soil pathogens, including fungi, bacteria, and nematodes, by applying to the subsurface of the soil the concentrated or diluted formulations of this invention.

In another embodiment of the invention, a stable concentrated pre-mix solution as described in the paragraphs above is used to treat arable soil, wherein the solution is added to irrigation water or in a holding vessel with water at low dosage, that is, less than about 2% by weight of polysulfides in the treatment water. The alkalinity in the metam, typically present as alkali hydroxides, will buffer the irrigation water solution and prevent precipitation. Advantageously the solution is free from added alkali sulfides, which are an immediate health concern.

The invention also relates to treating soil pathogens by adding, to the subsurface of the soil, a stable concentrated solution of an ammonium, alkali, or alkaline earth polysulfide, preferably comprising or consisting essentially of calcium polysulfide, in the absence of other fumigants. Advantageously the concentration of the calcium polysulfide is greater than 2% by weight, alternatively greater than 5% by weight, for example greater than 8% by weight, and in most preferred cases greater than 12% by weight. Said stable polysulfide is added to the subsurface of the soil, and applying includes mechanically disturbing the soil so as to assist movement of the calcium polysulfide solution through the soil, where the treatment rate is at least 100 pounds per acre (121 Kg/ha), more advantageously at least 150 pounds per acre (121 Kg/ha), for example between 200 pounds per acre (242 Kg/ha) and 400 pounds (484 Kg/ha) or to 600 pounds (672 Kg/ha) or 800 pounds per acre (987 Kg/ha). Alternatively the treatment rates are preferably over 40 gallons as liquid lime sulfur per acre (123 pound per acre or 138 kg/ha as calcium polysulfide). Preferred rates are at least 45 gallons per acre, more preferably at least 50 gallons per acre, for example at least 60 gallons per acre, or at least 80 gallons per acre, for example at least 100 gallons per acre, of liquid lime sulfur where the liquid lime sulfur has a density of 10.5 pounds per gallon and is about 29% by weight calcium polysulfide. These rates correspond to calcium polysulfide applied at a rate of at least 138 pound per acre, more preferably at least 153 pounds per acre, for example at least 184 pounds per acre, or at least 246 pounds per acre, for example at least 307 pounds per acre. These rates also correspond to calcium polysulfide applied at a rate of at least 155 Kg/ha, more preferably at least 172 Kg/ha, for example at least 206 Kg/ha, or at least 275 Kg/ha, for example at least 344 Kg/ha. Treatment with 300 gallons liquid lime sulfur per acre (921 pounds per acre or 1032 Kg/ha as calcium polysulfide) is not preferred as some residual phytotoxicity is observed on at least some vegetables. Advantageously in one embodiment the inorganic polysulfide treatment, preferably calcium polysulfide treatment, is done in the absence of pesticidal fumigants to provide a product that can in some jurisdictions be labeled "organic." This aspect of the invention more particularly relates to a method of treating soil for soil pathogens, particularly for treating fields where crop may be infected by the soil pathogens such as *Verticillium dahliae* (also known as potato early die or Verticillium wilt) and *Phytophthora infestans* (also known as late blight), comprising treating the subsurface of the soil with a concentrated aqueous solution of lime sulfur. Unlike fumigants, however, lime sulfur has very limited mobility in soil and is advantageously applied in a manner to maximize contact with the sub-surface pathogens over the soil profile depth of interest. If added as a concentrate to the top of soil, overwatering to move calcium polysulfide through soil is recommended. The concentration of the Lime Sulfur Solution™ and treatment rate in pounds of calcium polysulfide are higher than is normally used in drip irrigation and as soil amendment treatments. Additionally, the efficacy of the calcium polysulfide in killing the pests is enhanced if the moisture content of the soil is high, for example greater than 60%, preferably greater than 70%, to increase dispersion of the active ingredient.

The polysulfide can be one or more of calcium polysulfide, barium polysulfide, ammonium polysulfide, calcium polysulfide, potassium polysulfide, sodium polysulfide, or mixture thereof. Barium polysulfide is not preferred due to Ba toxicity. Ammonium polysulfide, especially formulations where ammonium polysulfide is the primary polysulfide, is not preferred due to handling difficulties. Sodium polysulfide, especially formulations where sodium polysulfide is the primary polysulfide, is not preferred as it adds undesirable sodium (Na) to the soil. Potassium polysulfide, especially formulations where potassium polysulfide is the primary polysulfide, is not preferred due to cost. Magnesium polysulfide is not preferred as it is unstable. Calcium polysulfide is a safe, inexpensive, and available in rather high concentration. Preferably the inorganic polysulfides comprise at least 50%, for example at least 80%, and preferably at least 90% by weight of the total inorganic polysulfides in solution.

An example is a stable concentrated liquid solution, said stable concentrated liquid solution comprising between 2% and about 30% of calcium polysulfide; between 2% and about 54% of a soil fumigant, said fumigant comprising a salt of a dithiocarbamate; and water. Concentrated solutions are preferred, so another example comprises between 4% and about 30% of calcium polysulfide; between 4% and about 54% of a soil fumigant, said fumigant comprising a salt of a dithiocarbamate; and water. Generally, when we state "dithiocarbamate" we include alkyl-substituted versions thereof including N-methyldithiocarbamate, which is the preferred fumigant. The stable concentrated liquid solution contains both the fumigant and the inorganic polysulfide. For the exemplary solution where the dithiocarbamate is methyldithiocarbamate, and the inorganic polysulfide is calcium polysulfide (having an average molecular formula of $CaS_x$ where x is between 4 and 5), the weight ratio of the salt of the methyldithiocarbamate to the calcium polysulfide is between about 10:1 to about 1:10, for example between 1:9 to 9:1, or alternatively between about 5:1 to 1:5. The commercial blends may have a weight ratio of inorganic polysulfide (preferably comprising or consisting essentially of calcium polysulfide) to fumigant (preferably an MITC-generating fumigant) of between 4:1 to about 1:15.

As previously stated, unless otherwise specified, "liquid lime sulfur" or "LLS" or Lime Sulfur Solution™ is a 28% to 29% by weight aqueous solution, containing about 3 pounds of calcium polysulfide, formula $CaS_x$, in one gallon, where x is a value between 4 and 5, typically between 4.3 and 4.6. $CaS_2$ can be used but higher sulfur content is preferred. Commercially, sodium metam is a typically a 42% solution, and potassium metam is typically about a 56% solution. When we state a treatment rate of 40 gallons sodium metam and 20 gallons liquid lime sulfur, what is meant is a treatment at a rate of 60 gallons per acre of the mixture, where the treating composition contains a mixture of 40 gallons sodium metam at the commercial concentration and 20 gallons liquid lime sulfur at the commercial concentration, applied as a mixture. The ingredients are advantageously used to treat soil as a mixture.

We have surprisingly found that a stable concentrated liquid solution can be formulated, said stable concentrated liquid solution comprising between 4% and about 30% of calcium polysulfide, between 4% and about 56% of a soil fumigant, said fumigant comprising a salt of a dithiocarbamate, and water. In certain conditions, the preferred concentrated solution contains between 10% and 50% by weight, for example between 15% and 40% by weight, of the total of the dithiocarbamate salts and inorganic polysulfides, e.g., calcium polysulfide. The solution is preferably free of alkali sulfides. The weight ratio of calcium polysulfide to alkali metam is between about 15:1 to about 1:15, or between about 10 to 1 to about 1:10, for example between about 4:1 to 1:4, or between 2:1 to 1:2, or any ratio using the above listed boundaries in any combination.

The invention also relates to treating soil pathogens with the concentrated solution, advantageously comprising or consisting essentially of a dithiocarbamate fumigant and an inorganic polysulfide, said polysulfide preferably comprising or consisting essentially of a calcium polysulfide, and a fumigant that is stable in a concentrated solution of the inorganic polysulfide, preferably the fumigant comprising a dithiocarbamate, more preferably comprising or consisting essentially of an alkali salt of methyldithiocarbamate. Advantageously, the treatment is applied below the surface of the soil, particularly at a depth of about 2 inches or more below the surface of the soil, for example below 4 inches below the surface of the soil. Often treatment is applied at more than one depth, for example at 4 inches depth and at 8 inches depth. Advantageously in one embodiment the treating solution comprises or consists essentially of at least 2% by weight polysulfide, preferably calcium polysulfide, and at least 0.5% of a salt of a dithiocarbamate fumigant. In another embodiment the treating solution comprises greater than 5% by weight of polysulfide and greater than 2% by weight of the dithiocarbamate. In one aspect the fumigant is a salt of metam, and the concentration of the salt of metam and the concentration of the polysulfide, preferably comprising or consisting essentially of calcium polysulfide, in the concentrated solution are each greater than about 5% by weight, for example greater than 8% by weight, or alternatively greater than 12% by weight. It is believed that the high concentrations of the compounds, that is, the high concentration of inorganic polysulfides admixed with a dithiocarbamate fumigant, preferably liquid lime sulfur admixed with a metam, results in more uniform effectiveness of metam, possibly due to lower rates of degradation by adverse soil conditions, increased soil retention, or improved distribution of the metam or methyl isothiocyanate (MITC) in soil.

While treating with a pre-mix is desired, the invention in a different embodiment also includes treating soil with tank mix or in a flowing pipe mix, where said mix includes both the MITC-generating fumigant, for example a salt of metam, and an inorganic polysulfide, for example calcium polysulfide, wherein the mix comprises more than 1%, for example more than 2% by weight of the inorganic polysulfide, or wherein the applied amount is sufficient to add more than about 100 pounds per acre of the polysulfide, preferably calcium polysulfide, along with the MITC-generating fumigant.

In another embodiment a stable concentrated liquid solution can be formulated, said stable concentrated liquid solution comprising between 4% and about 50% of an alkali, alkaline earth, or ammonium polysulfide, between 4% and about 56% of a soil fumigant, said fumigant comprising or consisting essentially of an MITC-generating compound, or a salt of a dithiocarbamate, preferably methyldithiocarbamate or salt thereof; and water. In most preferred conditions, the concentrated solution contains between 10% and 50% by weight total of the dithiocarbamate salts and polysulfide salts. The solution is preferably free of alkali sulfides. However, the solution can contain alkali hydroxides, surfactants, and other adjuvants. The solution preferably contains at least 2% calcium polysulfide, in addition to other polysulfides. Inorganic polysulfides include barium polysulfide, ammonium polysulfide, calcium polysulfide, potassium polysulfide, and sodium polysulfide. The weight ratio of polysulfides to fumigant depends on the atomic weight of the inorganic polysulfide and the salt of fumigant selected. Since a preferred pairing of ingredients are sodium metam (mole weight 129.2 grams) and calcium polysulfide (mole weight of about 180 grams), in another embodiment the weight ratio of calcium polysulfide to sodium metam is between about 15:1 to about 1:15, about 10:1 to about 1:10, or alternatively about 8:1 to 1:8, for example between about 4:1 to 1:4, or between 2:1 to 1:2, or any ratio using the above listed boundaries in any combination. In a 1:1 weight ratio, there is about 1.4 moles metam sodium to mole of calcium polysulfide. Weight ratios can easily be calculated based on the molar weights of other fumigants and polysulfides In another embodiment the mole ratio of inorganic polysulfide to fumigant, said fumigant being selected from one or more of a sodium metam, potassium metam, other MITC generator, or combinations thereof, is between about 15:1 to about 1:15, or about 10:1 to about 1:10, or alternatively about 8:1 to 1:8, for example between about 4:1 to 1:4, or between 2:1 to 1:2, or any ratio using the above listed boundaries in any combination.

In another embodiment of the invention, a concentrated solution as described above is used to treat soil. It can be important to use concentrated liquids for application subsurface using a shank or other such mechanical device. The growers do not have the capacity to haul large tanks of diluted compositions in these operations. Metam as either sodium or potassium salts are typically sold in concentrations greater than 20% by weight, for example between 25% and 45% for sodium metam (also called metam sodium), or between 35% and 42% by weight for sodium metam. For potassium metam, the concentration is even greater, say between 20% and 70%, for example between 35% and 65%, often nearer 60% by weight for some commercial products. As some of the mixtures of the present invention can be made by simply admixing commercially available metam and polysulfide compositions, say in a ratio between 1:20 to 20:1, the resulting compositions will typically have less of both the fumigant and of the polysulfide than the formulations from which it was made. This is not always the case, however, as more concentrated products than are routinely marketed can be used to formulate the pre-mix of fumigant and polysulfide.

The invention includes concentrated forms of polysulfides of all types, e.g., alkali salts and alkali earth metal salts, and even in less preferred variations ammonium polysulfide. As calcium polysulfide is particularly preferred over the other forms of polysulfide, the discussion will primarily focus on a concentrated aqueous solution of lime sulfur, called herein "liquid lime sulfur" or "LLS" or "LSS". While liquid lime sulfur is usually used in the field in highly diluted form (typically diluted at least 25:1 to as much as 500:1 by volume with water), liquid lime sulfur is typically sold at concentrations greater than 20% by weight, for example, between 20% and 30% by weight, or between 25% and 29% by weight.

In a preferred embodiment of the invention, a highly concentrated stable solution of an alkali salt of metam and of an inorganic polysulfide are injected into the soil in ground that will be used for planting vegetables and small fruit including tomatoes, strawberries, or other crops. In most preferred embodiments, the solution contains more than 2%, preferably more than 4%, and typically more than 6% or more than 8% total of the fumigant(s), for example a sodium and/or potassium salt of a dithiocarbamate fumigant such as metam, and of the inorganic polysulfide(s), such as calcium polysulfide.

In another embodiment of the invention, a concentrated solution as described in the paragraphs above is used to treat soil, wherein the above solution is added to irrigation water at low dosage, that is, less than about 2% by weight or less than about 1% by weight of polysulfides in the treatment water, said solution further comprising a salt of metam and an alkali hydroxide. Dilute liquid lime sulfur going through the sprinklers may eventually result in precipitation and nozzle clogging. The solutions of the invention are therefore advantageously slightly basic, typically the result of added alkali hydroxides, to buffer the irrigation water solution and prevent precipitation during injection. Potassium hydroxide is preferred. Based on laboratory testing, we determined that KOH at less than 1%, for example between about 0.1% to 1%, or between 0.2% to 0.5%, by weight, will prevent precipitation of diluted calcium polysulfide solutions in water. Advantageously the alkali hydroxide is added to the dilution water before or at the same time as the polysulfide. During chemigation, a typical dilution would be the number of gallons of treatment, say for example 80 gallons of a 1:1 mixture of a metam solution (40% or 42% for metam sodium, or ~52% to 54% for potassium metam), and a solution of liquid lime sulfur (29%). For chemigation, this solution may be diluted in 14000 gallons of water, providing about 0.5 inches of treated water.

We believe the liquid lime sulfur alone when applied in a concentrated form, or in sufficiently high dose in such a manner such that calcium polysulfide permeates through the soil column, has pesticidal efficacy against the above-mentioned diseases. It is believed that the liquid lime sulfur in concentrated form when mixed with metam (beneficially also in concentrated form), can stabilize and protect the metam from degradation from particular types of soils, increased soil adsorption or retention, and improved distribution of metam or methyl isothiocyanate (MITC) in soil. Calcareous soils and soils containing high amounts of clay degrade the performance of metam. Concentrated liquid lime sulfur reacts with many components of the soil that would otherwise suppress metam utility.

Additionally, calcium polysulfide has its own activity. In the presence of metam the activity of the calcium polysulfide may be suppressed, as the metam will tend to kill nearby pests. When concentrated liquid lime sulfur is spilled on the ground, the material reacts quickly with the soil, and the reactions leave stains where the soil was contacted by the liquid lime sulfur. Apparently, when concentrated solutions of inorganic polysulfide and dithiocarbamate are used to treat the subsurface of the soil, especially those comprising or consisting essentially of concentrated calcium polysulfides and an alkali salt of metam, the reactions between the polysulfides and the soil slow the degradation of metam from calcareous deposits and clays in the soil. Without being bound by theory, the cause may also be salt displacement resulting in better MITC movement in the soil profile, or a sulfur effect, that is, polysulfide effects the disease organism in a similar manor as occurs on foliar applications, or the activity may be due to formation of very small S crystals within the soil, or finally immediate reaction between concentrated polysulfide in the soil which in some form neutralizes adverse properties of the soil, thereby preventing degradation of metam and/or MITC. Untreated, the metam half life in the soil is ~8 hours, and MITC in the soil liquid-solid phases were highest within about 2 hours after a Metam-sodium application. As a result, the applied metam, when applied to high clay and especially to highly calcareous soils, can be as effective as metam applied to sandy loamy soils. When applied together to the subsurface of soil, the lime sulfur is believed to keep the metam from reacting with and binding to soil, being absorbed, or being converted into non-efficacious compounds. Therefore, in many soil types the applied metam may have increased efficacy.

Additionally, the concentrated liquid lime sulfur alone or in combination with the dithiocarbamate has a pesticidal effect against certain soil-borne diseases, including surprising efficacy against *Verticillium* and potentially against other diseases. In laboratory tests, liquid lime sulfur alone, used in fairly high treatment rates that exceed that normally used as a soil amendment agent, had activity on an important potato disease called *Verticillium dahliae*, or potato early die (PED). The activity seems dependent on soil moisture content. A treatment rate for calcium polysulfide alone, without use of other fumigants, requires greater than 100 pounds of calcium polysulfide added per acre. The movement of calcium polysulfide through soil requires water. Advantageously, when the formulations of this invention are shanked, tilled, or injected into the ground, the water content of the soil is above 50% capacity, for example at 70% capacity or more. Further, greater efficacy is observed if the soil contains sufficient moisture, at least 60% of theoretic capacity, more preferably at least 80% of theoretical capacity. Methods are known in the art for determining the water capacity of soil. Calcium polysulfide cannot migrate through gas but can only be spread via diffusion through water. In one embodiment the treatment is dispersed in concentrated form below the surface of the soil, for example with shanks.

In another embodiment the formulations of this invention, exemplified by a concentrated calcium sulfide/metam premix, can be added to irrigation water. Therefore treating solution need not be concentrated but rather can be added to irrigation water. Treatment rates of greater than 30 gallons of concentrated 29% liquid lime sulfur per acre, or greater than 90 pounds of calcium polysulfide per acre, are needed to show commercially acceptable effect on the target pests in the absence of other fumigants. Preferred treatment rates are greater than 120 pounds per acre, or greater than about 150 pounds per acre, for example between about 180 pounds and 1200 pounds per acre, more typically between about 210 pounds and 700 pounds calcium polysulfide per acre, applied to treat to a depth of from near or at the soil surface to for example at least 3 inches, or at least 6 inches, or to at least 9 inches, or to at least 12 inches depth. Generally, to reach such depth a formulation applied at the surface would need to be applied using between 0.5 and 1.5 inches of water, depending on the soil water content. The calcium polysulfide can be added to the water, but it should be applied quickly to allow migration of the inorganic polysulfide, for example calcium polysulfide, to migrate down to treatment depth before being totally reacted or absorbed by soil. Alternatively, a fairly concentrated solution can be added to the soil surface and then permeated through the soil by overwatering. If the calcium polysulfide is added as a too concentrated solution, reaction with various soil constituents can be very rapid. For applying calcium polysulfide alone to the surface of arable soil, to reduce pathogens prior to planting, the preferred concentration is greater than 1%, for example greater than 1.5% by weight calcium polysulfide, but less than 10% by weight calcium polysulfide.

One potential issue is that dilute solutions of liquid lime sulfur, especially when the dilution water contains substantial carbonic acid and/or dissolved oxygen, can over time result in calcium polysulfide degradation and solid precipitation, thereby potentially plugging lines. We have found alkali salts of metam in the metam/calcium polysulfide formulation partially retard this effect, possibly due to slight amounts of caustic in the composition. Therefore, in one embodiment a dilute yet strong solution is desired, for example between 2% and 6% by weight of calcium polysulfide (and optionally metam or salt thereof) and the treatment can advantageously be followed by overwatering to flush nozzles. At concentrations of over 1% polysulfide with metam, the polysulfide will not "bloom" or degrade and precipitate. At a concentration of less than 0.1%, calcium polysulfide will readily bloom and degrade, potentially in irrigation lines. This may be prevented by adding oxygen scavengers, for example enough to remove 2 ppm, 4 ppm, or at worst 8 ppm of oxygen from the irrigation water. Alternately or additionally, the pH of the water can be maintained or be brought back to about pH 8 or above with hydroxides, for example alkali hydroxides. Such conditions will help prevent polysulfides from degrading, at least until the material is into the ground where the material is intended to degrade and to provide both pesticidal effect and to prevent unwanted early degradation and neutralization of the fumigant, e.g., metam, by certain soil conditions, allowing the applied metam to be as effective as if the metam had not encountered such conditions, e.g., highly calcareous soil and the like. Advantageously the formulations of this invention contain little or no added alkali sulfides, as this material can under certain conditions create health risks. By little or no alkali sulfides, we mean less than 100 ppm added alkali sulfides added, or less than 50 ppm alkali sulfides added, or less than 10 ppm alkali sulfides added, and preferably no alkali sulfides added. We note that metam solutions typically have some alkali hydroxides, and during storage in a solution with polysulfides some alkali sulfides may form.

Note the metam/polysulfide mixtures of the invention are useful for treating all agricultural and horticultural plants for which metam alone is useful. The inorganic polysulfide/fumigant mixtures of the invention are useful for treating all agricultural and horticultural plants for which the particular fumigant alone is useful. The calcium polysulfide treatment, without fumigants, is useful to treat soil pathogens for many agricultural and horticultural plants, provided the treatment and the eventual increase in soil pH and sulfur content does not adversely affect the plants.

In all embodiments, performance can be enhanced by addition of adjuvants, including for example additive to enhance a LSS plus metam combination product, including e.g. stability/storability enhancer, odor mitigation, surfactants, and the like. Calcium polysulfide stability can be enhanced by addition of minor amounts of caustic, e.g., 3% or less, more typically 1.5% or less, for example 0.5% by weight or less of alkali hydroxides. In irrigation system application, sufficient caustic to maintain a pH above about 8 will delay polysulfide decomposition. In any of the above embodiments, the stability of the solution can be promoted by the addition of alkali sulfites, typically present in amounts of 1% or less, for example between 0.01% and 0.5% by weight. Various other additives, including hygroscopic gels, penetrators, and the like can also be included as adjuvants. Generally, the entire adjuvant formulation added will be less than 5% by weight of the composition, with active ingredients (fumigant and polysulfides) and water comprising the remaining ingredients.

Of course, the polysulfides, e.g., alkaline earth polysulfides, will rapidly degrade in the soil despite treatments to retard degradation in water or chemical distribution lines. This is beneficial for the soil. It is not known how calcium polysulfide kills or inhibits the soil pathogens, in particular the *Verticillium* pathogens. Without being bound by theory, polysulfide degradation at or very near the pathogen to form microcrystalline sulfur may cause the reduction of pathogens. And of course, the degradation products, calcium salts and sulfur, benefit the soil. Sulphur deficiency has recently become a widespread nutrient disorder in crops, largely due to restrictions on fossil fuel burning which has in turn reduced the sulfur oxides in the rain.

In a broad embodiment, one aspect of the invention is using polysulfides, especially inorganic polysulfides, and most preferably soluble alkaline earth polysulfides, to provide a stable alkaline environment when admixed with certain fumigants. One class of fumigants particularly useful in the invention are those that are 1) degraded by direct contact with acids, but 2) are also degraded by or not effective in calcareous soils. One class of fumigants particularly useful in the invention are those that are 1) degraded by direct contact with acids, but 2) are also degraded by or not effective in high-clay-content soils. This broad aspect of the invention may be applicable to other fumigants, especially those fumigants that do not degrade when exposed to polysulfides.

Certain fumigants are not compatible with polysulfides. Contact with polysulfides was found to result in rapid dehalogenation of methyl iodide (MeI), 1,3-dichloropropene (1,3-D), and chloropicrin (CP). It is not known whether the adverse reaction may actually be slowed by high concentrations of inorganic polysulfides. In most instances, use of these fumigants that rapidly degrade when in contact with calcium polysulfide is not recommended unless stabilizers are added. A mixture with concentrated polysulfide may be useful with certain other fumigants including the dithiocarbamates, Methyl N'N'-dimethyl-N-[(methylcarbamoyl) oxy]-1-thiooxamimidate, Fluopyram, mustards including AITC generators or solutions, or mixtures thereof.

In another embodiment of the invention the liquid lime sulfur and the fumigant can be added independently. This will require separate nozzles on the shanks, however, and multiple tanks. Such systems, where polysulfide and fumigant are admixed on location, are less preferred as it requires multiple tanks and equipment not normally used in the industry. Such a system of multiple injection ports at different depth may be useful when treating soil at various depths, where the ratio of metam to inorganic polysulfide in the solution may be different for solutions injected at 2 to 8 inches or at 2 to 4 inches depth as compared to a solutions injected at more than 8 inches depth.

The concentrated LSS and Metam solution was shown to be effective to treat for late blight and *Verticillium*. The concentrated LSS and Metam formulation is also expected to be effective in the treatment of Strawberry diseases including Charcoal rot (*Macrophomina phaseolina*) and Phytophthora crown rot (*Phytophthora cactorum*), and for Potato diseases including Fusarium Dry Rot (*Fusarium solanum*), Tuber Rot (*Phytophthora infestans*), and Black Dot (*Colletotrichum coccodes*). While the pesticidal effects may be additive, the presence of polysulfide appears to reduces metam or MITC degradation by certain elements in certain soils, allowing the applied metam to be effective in soil types where it would otherwise be neutralized or less ineffective.

The invention is meant to be illustrated by, and not limited to, the examples.

EXAMPLE 1 AND COMPARATIVE EXAMPLES

Laboratory testing showed the ability of liquid lime sulfur, at application rates of 90 gal/acre (270 pounds/acre or 303 Kg/ha of calcium polysulfide) and at 270 gal/acre (540 pounds/acre or 929 kg/ha calcium polysulfide), to reduce vital *Verticillium* life stages in soil. These investigations were performed under laboratory conditions in an initial jar test. We also investigated the pathogen control efficacy of LSS treatments, at 30 gal/acre (90 pounds/acre or 101 Kg/ha of calcium polysulfide) and at 90 gal/acre (276 pounds/acre or 310 Kg/ha of calcium polysulfide), and combined Metam/LSS treatments using Sectagon® brand metam at 20 gal/acre Metam (84 pounds/acre or 94 Kg/ha of metam sodium) with 40 gal/acre LSS (122 pounds/acre or 138 Kg/ha of calcium polysulfide); and at 30 gal/acre Metam (126 pounds/acre or 138 Kg/ha of metam sodium) with 20 gal/acre LSS (60 pounds/acre or 67 kg/ha of calcium polysulfide). Results from both labs were similar and indicate a significant control efficacy of LSS at a 90 gal/acre of liquid lime sulfur rate, but in later 2016 tests the degree of control was lower than expected from the extrapolated results of the 2015 tests. This may be due to lower water saturation in the 2016 tests compared to the saturation in 2015 tests, which was near 100%. Combined treatments with LSS and Metam even at low rates, compared to what is typically applied commercially, were highly efficient in *Verticillium* control.

Each treatment listed in Table 1 was replicated 4 times. *Verticillium* levels in soil were assessed by dry incubation on semi selective media (NP-10) method. Soil collected from a Romaine lettuce field in Salinas, Calif. was used for the investigation. Soil was confirmed to be infested with *Verticillium* before the investigation started.

Experimental Setup: Seven treatments were installed in 4 replicates each. Each replicate contained 20 g of dry soil in one sterile glass jar. Soil was adjusted to 20% (wt.) water content (approx. 60-70% field capacity, according to the soil analysis of 2015). Water adjusted soil was treated with the LSS and optionally also with Metam. The equivalent of gal/acre was calculated on the assumption that on acre of soil has an average weight of 3,625,895 lbs. A non-treated control and a water-treated control were included. A total volume 1 ml liquid was applied to each jar (exception: non-treated control). After treatment, the soil in each jar was well mixed and incubated at room temperature for three days in the dark. After incubation, soil was placed on a greenhouse bench and dried inside the jars for a week. Afterwards, soil was split between the two laboratories and were assessed according to the method described.

*Verticillium* levels in soil were assessed by dry incubation on semi selective media (NP-10). *Verticillium* assessments were parallel done for all samples in two separate laboratories: UC Davis and UC ANR. A soil obtained from a Romaine lettuce field in Salinas, Calif. (collected September 2015) was used for the investigation. Soil was confirmed to be infested with *Verticillium* before investigation started. Seven treatments were installed in 4 replicates each. Each replicate contained 20 g of dry soil in one sterile glass jar. Soil was adjusted to 20% (w) water content (approx. 60-70% field capacity, according to the soil analysis of 2015). Water adjusted soil was treated with the LSS or Metam or both respectively.

The quantity of *Verticillium* in soil was assessed by dry soil plating on NP-10 semi-selective medium. Soil samples were air-dried for 2 weeks in the greenhouse, crushed and sieved through a #20 mesh. A total of 0.5 g dried and sieved soil of each sample was incubated on six NP-10 semi-selective plates with a 2-Stage Impactor (e.g. Anderson Samplers Inc., Atlanta, Ga.). All NP-10 plates were prepared according to Kabir et al. (2004). Plates were incubated at room temperature in the dark for three to four weeks. After that, remaining soil was gently washed off the plates and the number of *Verticillium* microsclerotia colonies were counted on each plate under a microscope. The number of microsclerotia colonies is used as a standard method to quantify *Verticillium* in soil and was extrapolated for 1 g soil.

Results were analyzed in a one-way ANOVA (P=0.05) and a Fisher LSD Post-Hoc test. Analyzes were done in R 3.3.0.

Higher levels of *Verticillium* were observed in 2016, compared to the 2015 study, although the soil was from the same field, collected at the same day. A variety of reasons might be responsible for those differences. Firstly, a different batch of the soil (which is stored in several buckets at 7° C.) was used for the 2016 investigations. Storage conditions for the 2015 (not refrigerated) and 2016 (refrigerated) soils also differed. Initial counts of *Verticillium* of the soil were done shortly before this study and indicated an infection level similar to non-treated and water control treatments.

The investigations of 2015 also indicated *Verticillium* control with LSS at 90 gal/acre and LSS at 270 gal/acre was similar to Metam at 68 gal/acre. The data obtained here showed an effect where LLS suppresses *Verticillium*, but not as pronounced, at the treatment rate. We observed a significant decline of *Verticillium* infestation in LSS @ 90 gal/acre, but with higher absolute numbers than in both Metam and Metam-LSS-combined treatments. A variety of reasons could be the explanation, reaching from different water levels in soil to differences in media (age, incubation etc.).

The higher counts of the NTC in the USC-Davis are due to high numbers of microslerotia ("ms") colonies on 5 plates. These might be due to conglomeration effects of soil on the plate. All other counts of the controls (both Water controls and S. Koike's NTC) go towards 170 MS/g, leading to the assumption, that 170 MS/g is more representative for unrestricted growth in the soil we used.

TABLE 1

Microsclerotia counts post-treatment, colonies per gram of soil, 2016 test.

| Name | LSS ®* | Metam** | Verticillium quantity (ms/g) | |
|---|---|---|---|---|
| | | | Lab A | Lab B |
| Untreated Control | none | none | 210 ± 14 | 168 ± 7 |
| Water Control | none | none | 176 ± 12 | 166 ± 13 |
| Example 1 | 30 gal/a | none | 121 ± 14 | 146 ± 20 |
| Example 2 | 90 gal/a | none | 91 ± 11 | 122 ± 19 |
| Comp. Example 3 | none | 40 gal/a | 0.5 ± 0.5 | 12 ± 3 |
| Example 4 | 20 gal/a | 30 gal/a | 1 ± 0.5 | 4.5 ± 2 |
| Example 5 | 40 gal/a | 20 gal/a | 0.5 ± 2.6 | 12.5 ± 1 |

*Lime-Sulfur Solution ™ brand liquid lime sulfur, from Tessenderlo Kerley Inc, 29 wt. % calcium polysulfide, 3.07 lbs. calcium polysulfide per gallon.
**Metam sodium was Sectagon-42 ® brand metam, from Tessenderlo Kerley Inc., containing 4.25 lbs. sodium methyldithiocarbamate per gallon, 42.2 wt %.

Example 1 had 92 pounds per acre (103 kg/ha) calcium polysulfide equivalent. Example 2 had 276 pounds per acre (310 kg/ha) calcium polysulfide. Example 3 had 170 pounds per acre (190 kg/ha) of metam sodium. Example 4 had 128 pounds per acre (143 kg/ha) metam sodium and 61 pounds/acre (38 kg/ha) of calcium polysulfide). Example 5 had 85 pounds/acre (95 kg/ha) of metam sodium and 123 pounds per acre (138 kg/ha) of calcium polysulfide. Replacing metam with calcium polysulfide in the concentrated metam/calcium polysulfide solution, where 42.5 pounds/acre of metam is replaced with 60 pounds/acre of calcium polysulfide, showed no decrease in activity.

The major difference between the 2015 tests and the 2016 tests was soil moisture. For the 2015 tests the soil moisture was set at 35% w/w (ca. 100% field capacity). For the 2016 tests, the soil moisture was set at 20% w/w (ca. 66% field capacity).

Verticillium assessments were performed parallel in two separate laboratories. There were systematic differences between labs, but trends were the same. The quantity of Verticillium in soil was assessed by dry soil plating on NP-10 semi-selective medium. Soil samples were air-dried for 2 weeks in the greenhouse, crushed and sieved through a #20 mesh. A total of 0.5 g dried and sieved soil of each sample was incubated on six NP-10 semi-selective plates with a 2-Stage Impactor (e.g. Anderson Samplers Inc., Atlanta, Ga.). All NP-10 plates were prepared according to Kabir et al. (2004). Plates were incubated at room temperature in the dark for three to four weeks. After that, remaining soil was gently washed off the plates and the number of Verticillium microsclerotia colonies were counted on each plate under a microscope. The number of microsclerotia colonies is used as a standard method to quantity Verticillium in soil and was extrapolated for 1 g soil. LSS at 90 gal/acre (276 pounds/acre or 310 kg/ha of calcium polysulfide) was confirmed by both laboratories to have a suppressive effect on the growth of Verticillium. LSS at 30 gal/acre (92 pounds/acre or 103 kg/ha of calcium polysulfide) had a suppressive effect, but substantially lower that at higher rates.

Higher levels of Verticillium were observed in 2016, compared to the 2015 study. Soil storage conditions for the 2015 (not refrigerated) and 2016 (refrigerated) soils also differed. Initial counts of Verticillium of the soil were done shortly before this study and indicated an infection level similar to non-treated and water control treatments. The investigations of last year (2015) also indicated Verticillium control with LSS at 90 gal/acre and LSS at 270 gal/acre on similar levels to Metam applied at 68 gal/acre. The 2016 test results only partly confirm those 2015 test results. We observed a significant decline of Verticillium infestation in LSS @ 90 gal/acre, but with higher numbers of Verticillium than in soils treated with Metam and Metam/calcium polysulfide combined treatments. A variety of reasons could be the explanation, reaching from different water levels in soil to differences in media (age and incubation).

The higher counts of the NTC in the Fennimore Lab seemed to be due to high numbers of microsclerotia colonies on only 5 plates. These might be due to conglomeration effects of soil on the plate. All other counts of the controls were consistent between labs.

Higher dosage rates of LSS (as tested in 2015) might have a higher control effect. In combination with Metam, high control effects could be reached even with relatively low LSS and Sectagon® concentrations.

The general impact of LSS on fungal growth was also observed visually on the plates. Number of fungal colonies was successfully suppressed in treatments with higher concentrations of LSS. The Metam treatment also reduced fungal growth of soilborne fungi almost 100%.

Differences in test protocol between 2015 and 2016 tests are summarized below, and colony counts per gram of dry soil for the 2015 tests are shown below.
2015: Soil Moisture 35% w/w (ca. 100% field capacity)
2016: Decided 2015 soil moisture was too high; reduced to 20% w/w. (ca. 66% field capacity), assuming a bulk density of around 1.5 and a full field capacity at let's say 45% volume (v/v) (mostly clay and silt) and a wilting point at 15% volume v/v. Note that those are very rough estimates.
2015: Temperature Conditions: Storage of soil: 2015 soil was stored at room temperature until use.
2016: 2015 soil was stored at 7° C. prior to use in 2016. Incubation of plates (24° C. constant in 2015; room temperature in 2016).

Results of testing are shown in Table 2 below, and are compared with 2015 results for convenience.

TABLE 2

Microsclerotia (Verticillium) per gram of soil, after application water, liquid lime sulfur solution (LSS), and metam sodium solution (Metam), 2015 tests and 2016 test.

| Treatment | (gal. solutions/acre) | (kg active/ha) LSS + Met. | ms/g, 2015 | ms/g, 2016 |
|---|---|---|---|---|
| Untreated control | — | 0 + 0 | 36 | 190 |
| Watered control | — | 0 + 0 | 29 | 170 |
| LSS | 10 | 34 + 0 | 40 | |
| LSS | 30 | 103 + 0 | 0 | 133 |
| LSS | 90 | 309 + 0 | 3 | 106 |
| LSS | 270 | 928 + 0 | 2 | |
| Metam | 68 | 0 + 323 | 3 | |
| Metam | 40 | 0 + 190 | | 6.5 |
| LSS + Metam | 40 + 20 | 138 + 95 | 1.5 | |
| LSS + Metam | 30 + 20 | 103 + 95 | 12 | |

(LSS): as 3.07 pounds Calcium Polysulfide per gallon Liquid Lime Sulfur Solution.
(Metam): Sectagon ™, a 4.25 pound per gallon sodium methyldithiocarbamate solution.

EXAMPLE 5 AND COMPARATIVE EXAMPLES

A field test was performed in small plots in a grower's location in near Moses Lake, Wash. using commercial equipment, shanking the product 8-9 inches into the ground, in February 2016. A few treated areas were sampled a few months after treatment. This field is believed to be low in pest pressure. Testing confirmed that the two premix of a concentrated solution of liquid lime sulfur and metam was compatible in field conditions and in field equipment. The concentrated LSS-metam product was stable long-term. The mixture is compatible as a ground application, including using standard tanks, hoses, nozzles, and shanks. It is believed the product will also be stable when added to water to form a dilute product, due to the sodium or potassium hydroxide in metam. Therefore, alkali sulfide salts need not be added.

Location 1 was treated with 45 gallons per acre of Sectagon®, the metam sodium solution, equivalent to 191 pounds metam sodium per acre. This is considered a standard treatment protocol. Section 2 was treated with only liquid lime sulfur, at 90 gallons per acre (276 pounds calcium polysulfide/acre). Section 3 was treated with 30 gallons per acre Sectagon® and 30 gallons per acre liquid lime sulfur (92 pounds calcium polysulfide and 127 pounds metam sodium per acre). The treatment chemicals were obtained from Tessenderlo Kerley. A sufficient time following the treatments, *V. dahliae* concentrations and black dot concentrations were determined at 4 inches depth and at 8 inches depth at three random sample sites in each treated plot. The data are shown below. No controls were run, and the variability in samples were high. Locations treated with 45 gallons (191 pounds) per acre equivalent of metam sodium averaged 30 colonies of *V. dahlia* per gram of soil at four inches and 3 colonies of *V. dahlia* per gram of soil at eight inches. Locations treated with 90 gallons per acre equivalent of liquid lime sulfur (276 pounds calcium polysulfide per acre) averaged 23 colonies of *V. dahlia* per gram of soil at four inches and 4 colonies of *V. dahlia* per gram of soil at eight inches. Locations treated with 92 pounds/acre (103 kg/ha) of calcium polysulfide and 127 pounds/acre (142 kg/ha) of metam sodium equivalent averaged 11 colonies of *V. dahlia* per gram of soil at four inches and 11 colonies of *V. dahlia* per gram of soil at eight inches. Clearly sample variability was high and the 8 inch depth samples from section 3 are suspect, but the mixture of LSS and metam appears to be effective.

The metam and liquid lime sulfur combinations showed apparently good efficacy, though the sample variability due to small sample size is great. However, the mixtures were used with no problems with stability or with application with the grower's equipment.

TABLE 3 colonies per gram of soil at farm after treatment

|  | *V. dahliae*, 4" | *V. dahliae*, 8" | Black Dot, 4" | Black Dot, 8" |
|---|---|---|---|---|
| Location 1, metam, | 48 | 4 | 0 | 2 |
| Location 1, metam, | 18 | 0 | 0 | 0 |
| Location 1, metam, | 24 | 6 | 0 | 0 |
| Location 2, LSS ™ | 22 | 2 | 0 | 0 |
| Location 2, LSS ™ | 20 | 6 | 0 | 0 |
| Location 2, LSS ™ | 26 | 4 | 0 | 0 |
| Location 3, metam and LSS ™ | 16 | 2 | 0 | 0 |
| Location 3, metam and LSS ™ | 6 | 18 | 2 | 2 |
| Location 3, metam and LSS ™ | 12 | 12 | 0 | 0 |

EXAMPLE 6 AND COMPARATIVE EXAMPLES

Soil from a farm located in Washington state was treated with various solutions, and subsequently the population of *Verticillium* in treated samples were determined. Untreated samples contained 31 CFU per gram of dry soil. Soil treated with 90 gallons per acre liquid lime sulfur (276 pounds/acre or 309 kg/ha of calcium polysulfide) had less than 2 CFU per gram of dry soil. Samples treated with 138 pounds per acre (155 kg/ha) of calcium polysulfide, with 170 pounds per acre (190 kg/ha) of metam sodium, and with a combination of 138 pounds calcium polysulfide and 170 pounds of metam sodium per acre (190 kg/ha metam and 155 kg/ha calcium polysulfide) had 6 to 10 CFU per gram of dry soil, where the differences were not significantly correlated to any particular treatment. Testing the same soil for Pythium showed untreated samples contained 230 CFU per gram of dry soil, soil treated with 138 pounds calcium polysulfide per acre had 180 CFU per gram of dry soil, samples treated with 276 pounds calcium polysulfide per acre had 136 CFU per gram of dry soil. Samples treated with 170 pounds of metam sodium per acre and with a mixture of 138 pounds calcium polysulfide and 170 pounds of metam sodium per acre had about 70 to 80 CFU per gram of dry soil. In this test, the metam and calcium polysulfide combination showed no significant benefit over metam alone. The reason is not understood, and may reflect test protocols.

Clearly the test protocol and/or sample variability were over-riding factors. In tests on soil from another location, untreated soil had 150 CFU Pythium per gram of dry soil. Treating with liquid lime sulfur, at rates of 45 gallons per acre (138 pounds/acre or 155 kg/ha as calcium polysulfide) and at 90 gallons per acre and (276 pounds/acre or 310 kg/ha as calcium polysulfide), resulted in an average of 100 CFU Pythium per gram of dry soil. Treating with metam sodium solution, at rates of 20 gallons per acre (85 pounds/acre or 95 Kg/ha as metam sodium) and at 40 gallons per acre (170 pounds/acre or 190 Kg/ha as metam sodium), resulted in an average of 60 CFU Pythium per gram of dry soil. Treating with a combination of metam sodium and liquid lime sulfur, at rates of 20 gallons per acre and at 40 gallons sodium metam mixed with 45 gallons of liquid lime sulfur per acre, resulted in an average of 30 CFU *Pythium* per gram of dry soil. In these tests the combination of calcium polysulfide and sodium metam solution was superior to either alone, and the combination of calcium polysulfide and sodium metam solution at the 85 pounds/acre or 95 Kg/ha as metam sodium plus 138 pounds/acre or 155 kg/ha of calcium polysulfide rate was more effective than was treating with twice as much metam alone.

Testing the same soil for *Verticillium* resulted in untreated soil having 41 CFU per gram of dry soil. Treating with liquid lime sulfur, at rates of 45 gallons per acre and at 90 gallons per acre as described above, resulted in an average of 47 CFU per gram of dry soil. Treating with metam sodium, at rates of 20 gallons per acre and at 40 gallons per acre, resulted in an average of 30 CFU per gram of dry soil. Treating with a mixture of metam sodium and liquid lime sulfur, at rates of 20 gallons per acre and at 40 gallons sodium metam with 45 gallons of liquid lime sulfur also applied per acre, resulted in an average of 25 CFU Pythium per gram of dry soil. Sample variability made none of the tests significant in a numerical sense, though trends were apparent. Metam provided only modest suppression of the

*Verticillium*, as did calcium polysulfide treatments. Neither treatment eradicated the pests.

EXAMPLE 7 AND COMPARATIVE EXAMPLES

Laboratory and field experiments were conducted at UC Davis, Oregon State University and North Dakota State University in 2015 and 2016 to assess the *Verticillium dahliae* control efficacy of LSS. The results of those investigations indicate that LSS at rates over 90 gal/acre have the capacity to reduce vital *V. dahliae* life stages in soil. Previous data, presented above, suggest that high rates of LSS alone provide excellent knockdown and control if the soil is saturated with water, and partial control if soil is only 66% or so saturated with water. Furthermore, those results indicate that LSS in certain lesser amounts improves the control efficacy of metam-based fumigants (Sectagon®) under certain soil conditions. In particular, it was found that at ratios of about 3:1 to about 1:3 of gallons of metam to gallons of the calcium polysulfide solution provide improved efficacy over metam alone.

Under ideal conditions, in jar tests at high water saturation where volatilization is minimal and where mixing and contact of metam to all organisms are substantially assured, metam alone provides very high efficacy. However, as shown in both jar and field trials, as well as in agriculture, conditions are never ideal. It is believed that even a ratio of 10 gallons metam to one gallon LSS, that is, 42.5 pounds sodium metam to 3.07 pounds of calcium polysulfide, will under many treatment conditions show greater efficacy than treatment with metam alone. Further, while treatment with 40 to 45 gallons per acre of metam solution is commercially common, the combination product appears under certain conditions to provide commercially acceptable control at half the normal treatment rates of metam alone.

The tests done here, the preliminary results of which are set forth in Table 4 and are discussed below, further define the efficacy of both high rate treatment with calcium polysulfide and with more extreme ratios of metam to calcium polysulfide.

In these tests, greenhouse and microplot trials were done to further define the LSS efficacy as stand-alone treatment as well as in combination with Sectagon®. A large number of soil samples were treated using the rates below, expressed as gallons equivalent per acre of (LSS), a 3.07 pounds Calcium Polysulfide per gallon Liquid Lime Sulfur Solution, and Sectagon®, a 4.25 pound per gallon sodium methyldithiocarbamate (metam) solution. Each treatment was performed on six samples to provide statistically valid data. As always, though the treatment is defined in terms of gallons per acre of two products, the testing is with a mixture.

To minimize sample variability that was apparent in certain previous tests, these tests were a greenhouse study, using artificially infested *V. dahliae* soil. A soil derived from a Romaine lettuce field in Salinas, Calif. (collected September 2015) was confirmed (January 2017) to be highly infested with *V. dahliae*. Romaine lettuce were grown in the *V. dahliae* infested soil until microsclerotia built up in the leaves. Infested leaves were harvested, dried, crumbled, and mixed with autoclaved sand. Samples of the mixture were tested for *V. dahliae*. The mixture was used for the greenhouse study and for the production of pathogen bags for the microplot study.

Artificially infested *V. dahliae* soil were treated according to the above list. The greenhouse/eggplant study utilize a sterile sand+10% potting mix soil. The inoculated soil was pre-irrigated to ca. 70% field capacity for 14 days, and was then soil placed in various containers, each of which was then treated with appropriate LSS/Metam mixture in a certain volume of water. The soil was thoroughly mixed/agitated, and left sealed for 24 hours to simulate a water seal or tarp. The container was then unsealed 24 hours after application and allowed to sit for 14 days and then mixed and apportioned into 4" pots for growing eggplant as the bioassay.

Seven days after treatment, one soil sample per replicate was taken. *V. dahliae* control efficacy was assessed according to the methods below. Soil mixture was dried two weeks under greenhouse conditions. The quantity of *V. dahliae* in the soil was/will be assessed by dry soil plating on semi-selective medium. Dry soil samples were crushed and sieved through a #20 mesh. A small portion of each sample was incubated on six NP-10 semi-selective plates with a 6-stage Impactor (Anderson Samplers Inc., Atlanta, Ga.), using stages 2 and 3. Semi-selective NP-10 medium was prepared according to Kabir et al. (2004) and incubated at 24° C. in the dark for four weeks after spreading 0.5 g of soil. After incubation, the remaining soil was be gently washed off the plates and the number of *V. dahliae* microsclerotia colonies were counted on each plate under a microscope. The number of microsclerotia colonies equals the quantity of *V. dahliae* in soil and were extrapolated to 1 g of soil.

To simulate a situation closer to field conditions, a field based microplot study was also established for a few of the above tests, using eggplant. The greenhouse/eggplant study utilized a sterile sand+10% potting mix soil; the inoculated soil was pre-irrigated to ca. 70% field capacity for 14 days; soil was placed in a bucket, treated with appropriate LSS/Metam mixture in correct volume of water, thoroughly mixed/agitated, and left sealed for 24 hours to simulate a water seal or tarp. The bucket was unsealed at 24 hours after application and allowed to sit for 14 days and then mixed and apportioned into 4" pots for growing eggplant as the bioassay. Seven days after treatment, one soil sample per replicate was taken. *V. dahliae* control efficacy was assessed according to the methods below, but only on selected treatments due to time pressures. At 14 days after treatment, eggplants were grown in the remaining soil to assess treatment effects on vigor and growth. At 14 days after treatment, eggplants grown in the remaining soil were studied to assess treatment effects on vigor and growth. Microplots were located at the USDA Research Field at Spence Road, Salinas, Calif. Treatments were selected based on the results of the previous greenhouse study. Trial site was pre-irrigated for 7 days before placing the *Verticillium, V. dahliae*, sample bags in the various treatments. Sprinkler irrigation was used to establish 60-80% soil moisture. Four *V. dahliae* samples per replicate were artificially introduced at 4 and 8 inches depth. Treatments were applied with micro emitter and drip across the microplot. The treatment using a 2 hour drip irrigation period was anticipated to provide penetration to 12 inch depth. After treatment, microplots remained untarped. After 5-7 days *V. dahliae* samples were recovered.

All LSS and Sectagon® treatments were made, mixing the treatment well with the soil and covering to prevent outgassing on Jun. 27, 2017. On June 28 the lids were removed lids. On July 4 the buckets of treated soil were moved outside for aeration. On July 10 lettuce bioassays were performed to determine if safe to plant eggplant. On July 13 eggplant were transplanted to pots for bioassay.

In these tests, for liquid lime sulfur, treatment at 20 gallons per acre provided 60 pounds/acre or 67 kg/ha of calcium polysulfide, treatment at 45 gallons per acre provided 138 pounds/acre or 155 kg/ha of calcium polysulfide, treatment at 90 gallons per acre provided 276 pounds/acre or 310 kg/ha of calcium polysulfide, treatment at 180 gallons per acre provided 552 pounds/acre or 618 kg/ha of calcium polysulfide, and treatment at 300 gallons per acre provided 921 pounds/acre or 1030 kg/ha of calcium polysulfide. For the sodium metam, treatment with 20 gallons per acre provided 85 pounds/acre or 95 kg/ha of metam sodium, treatment with 30 gallons per acre provided 127 pounds/acre or 142 kg/ha of metam sodium, and treatment with 40 gallons per acre provided 170 pounds/acre or 190 kg/ha of metam sodium, and treatment with 20 gallons/acre metam mixed with 20 or 180 gallons per acre of liquid lime sulfur.

The data is preliminary as the plants were still immature at time of filing of this application. Within a column, any single value having a same letter may not be statistically different than other values having the same letter. Additionally, the water check samples were uncommonly vigorous. There were a few issues with the test. The metam treatments were close to ideal, with metam being provided and mixed into well-tilled moist soil and covered for a time, trapping the fumigant in the soil.

TABLE 3 eggplant height versus date for various treatments with NovaSource ® Liquid Lime Sulfur ("LLS", 3.07 pounds calcium polysulfide/gal.) admixed with NovaSource ® Sectagon-42 ® (4.25 pounds Sodium methyldithiocarbamate/gal.), all rates expressed as gallons per acre based on 12 inch (0.3 m) soil depth, eggplant height in (mm).

| Treatment per acre | Jul. 27, 2017 | Aug. 4, 2017 | Aug. 10, 2017 | Aug. 17, 2017 |
|---|---|---|---|---|
| 1. Comp. Untreated Check | 118f | 124h | 134g | 138f |
| 2. Comp. Water Check* | 120ef | 140efgh | 150defg | 154cdef |
| 3. Comp. 20 LSS gal | 123def | 139efgh | 145efg | 147ef |
| 4. 45 gal. LLS + 0 gal Sec. | 120ef | 133gh | 145efg | 149def |
| 5. 90 gal LLS + 0 gal Sec. | 131cdef | 139efgh | 146defg | 150def |
| 6. 180 gal LSS + 0 gal Sec. | 135cdef | 140efgh | 145defg | 149def |
| 7. 300 LLS gal + 0 gal Sec. | 143abcde | 148cdefg | 159bcdef | 161bcde |
| 8. Comp. 20 gal Sec + 0 gal LLS | 140abcde | 145 cdefg | 159 bcdef | 163bcde |
| 11. 20 gal Sec + 20 gal LLS | 143abcde | 159bcdef | 170abcde | 178ab |
| 12. 20 gal Sec. + 45 gal LLS | 140bcdef | 152cdefg | 160abcdef | 161bcde |
| 13. 20 gal Sec. + 90 gal LLS | 143abcde | 145defgh | 162abcdef | 161bcde |
| 14. 20 gal Sec. + 180 gal LLS | 150abc | 166abc | 170abcd | 174abc |
| 15. 20 gal Sec. + 300 gal LLS | 130 cdef | 139efgh | 139fg | 147ef |
| 9. Comp. 30 gal Sec. + 0 gal LLS | 138bcdef | 150cdefg | 155cdefg | 160bcdef |
| 16. 30 gal Sec + 20 gal LLS | 130 cdef | 137fgh | 149defg | 150def |
| 17. 30 gal Sec + 45 gal LLS | 130cdef | 145cdefg | 156 cdefg | 156bcdef |
| 18. 30 gal Sec + 90 gal LLS | 143 abcde | 147cdefg | 155cdefg | 162bcde |
| 19. 30 gal Sec + 180 gal LLS | 136cdef | 150 cdefg | 160bcdef | 162bcde |
| 20. 30 gal Sec + 300 gal LLS | 126def | 133gh | 148defg | 156bcdef |
| 10. Comp. 40 gal Sec. + 0 gal LLS | 150abc | 160bcde | 169abcde | 171acbd |
| 21. 40 gal Sec + 20 gal LLS | 163a | 180a | 183a | 185a |
| 22. 40 gal Sec + 45 gal LLS | 160ab | 174ab | 180ab | 185a |
| 23. 40 gal Sec + 90 gal LLS | 146abcd | 162abcd | 176abc | 174abc |
| 24. 40 gal Sec + 180 gal LLS | 140abcdef | 149 cdefg | 155cdefg | 159bcdef |
| 25. 40 gal Sec + 300 gal LLS | 136 cdef | 145defgh | 155cdefg | 158bcdef |

The comparative example 10, where the applied 40 gallon per acre Sectagon-42® (170 pounds Sodium methyldithiocarbamate/acre) is the commercial standard treatment for a field having disease pressure, provided excellent growth. Metam at commercial rates of 40 gallons per acre (170 pounds per acre or 190 Kg/ha as metam sodium) proved an effective treatment as determined by plant height. The only tests where the average plant height exceeded the 171 millimeters achieved by plants treated with 40 gallons metam sodium solution were: treatments with mixtures of 40 gallons per acre of metam sodium solution plus 20 gallons per acre, 45 gallons per acre, and 90 gallons per acre liquid lime sulfur; and treatment with 20 gallons per acre metam sodium solution and 180 gallons per acre liquid solution of lime sulfur. That is, including 20, 45, and 90 gallons/acre of liquid lime sulfur (aqueous calcium polysulfide) with the "normal" metam rate resulted in greater growth than metam alone, but the effect fell off slightly at 180 gallons of LSS/acre and to a large extent at 300 gal of LSS/acre. This trend held with one half of a commercial dose of metam (20 gal./acre) and for three quarters of a commercial dose of metam (30 gal./acre).

Despite a few instances of tall plants, treatment with 300 gallons LSS per acre (921 pounds calcium polysulfide per acre) resulted in some phytotoxicity, where plants looked chlorotic, whether the calcium polysulfide was applied by itself or with metam.

Essentially all treatments with metam and liquid lime sulfur had growth height that equaled the water check control and exceeded the untreated control. Treatment with LSS alone did not provide increases in plant height compared to the water check control, but plant height was above the untreated control. 300 gallons of LLS per acre rates the plants appeared chlorotic or not healthy. The reason the LSS has little effect on plant height is not known.

Plate tests were performed on selected samples to determine the *Verticillium* counts in treated soil through Aug. 17, 2017. Plate tests were performed as described previously. The untreated control comparative sample 1 averaged 32.5 ms per gram of soil. For reasons not known, the water check comparative sample 2, with no active ingredients added, contained only 11.5 ms per gram of soil. This explains why the water check sample 2 had such good growth compared to control comparative sample 1. Comparative sample 3 soil treated with 20 gal LLS per acre has 1.5 ms per gram of soil. Sample 5 soil treated with 90 gal LLS per acre has 4.5 ms per gram of soil, and sample 7 soil treated with 300 gallon LLS per acre has 2.5 ms per gram of soil. Clearly the LLS addition reduced the *Verticillium dahliae* population to well below that of the controls that is, to about 3 ms per gram of soil, but the effect was somewhat independent of the amount of calcium polysulfide added. The soil was not saturated, and therefore it is believed that the effect of calcium polysulfide is limited by contact or very close proximity of the active ingredients to the pests. Therefore, insufficient mixing of LLS into soil, and the inability of the calcium polysulfide to migrate in soil having 65% humidity, would account for variability.

Metam, on the other hand, forms a gas which permeates through soil. Further, as mentioned, the treatment protocol emulated "ideal" conditions, with excellent mixing and a cover for one day to prevent outgassing. Treatment with 20 gal./acre metam, one half the normal applied rate, reduced the *Verticillium dahliae* population to 3 ms per gram of soil. This is about the same as the average of the liquid lime sulfur treatments. But treatment rates of 40 gal/acre metam, and treatment rates of 20, 30, and 40 gallons per acre of metam accompanied by 300 gallons of the LSS calcium polysulfide solution, essentially eradicated the *Verticillium dahliae*, with measurements being 0 or 0.5 ms per gram of soil.

The invention is illustrated by the examples but is not limited to the examples.

What is claimed:

1. A method of controlling soil pathogens in arable soil, said method comprising applying to the surface or subsurface of the arable soil a stable, concentrated liquid solution, said stable, concentrated liquid solution comprising little or no alkali sulfides and comprising:
    (a) at least about 4% total by weight of an inorganic polysulfide;
    (b) at least about 2% by weight of said soil insecticide or soil fumigant; and
    (c) water.

2. The method of claim 1, wherein said stable, concentrated liquid solution comprises between about 4% and about 30% by weight of inorganic polysulfide, and between about 4% and about 54% by weight of a soil fumigant, said fumigant comprising a dithiocarbamate and said inorganic polysulfide comprising calcium polysulfide.

3. The method of claim 2, wherein the dithiocarbamate comprises an alkali salt of N-methyldithiocarbamate, and wherein the weight ratio of the fumigant to the inorganic polysulfide is between about 10:1 to about 1:10.

4. The method of claim 2, wherein the dithiocarbamate comprises a sodium salt of N-methyldithiocarbamate, a potassium salt of N-methyldithiocarbamate, or mixture thereof, and wherein the inorganic polysulfide comprises at least about 80% by weight calcium polysulfide based on the weight of inorganic polysulfide present.

5. The method of claim 4, wherein the weight ratio of the salt of the N-methyldithiocarbamate to the calcium polysulfide is between about 10:1 to about 1:10.

6. The method of claim 2, wherein the fumigant comprises a salt of metam, and the inorganic polysulfide comprises calcium polysulfide, and wherein the concentration of the salt of metam and the concentration of the calcium polysulfide in the concentrated solution are each greater than about 8% by weight.

7. The method of claim 1, wherein at least a portion of said stable, concentrated liquid solution is placed at a depth about 4 inches subsurface or below.

8. The method of claim 1, wherein said stable, concentrated liquid solution comprises:
    (a) between about 4% and about 50% by weight of an alkali, alkaline earth, or ammonium polysulfide, or mixture thereof;
    (b) between about 4% and about 56% by weight of a soil fumigant; and
    (c) water.

9. The method of claim 8, wherein said stable, concentrated liquid solution comprises:
    (a) between about 4% and about 50% by weight of an alkali, alkaline earth, or ammonium polysulfide, or mixture thereof;
    (b) between about 4% and about 56% by weight of a soil fumigant, said fumigant comprising a salt of methyldithiocarbamate or other methyl isocyanate (MITC) generator; and
    (c) water.

10. A method of controlling soil pathogens, said method comprising applying to a location subsurface of the soil:
    (a) an effective amount of a polysulfide solution with little or no alkali sulfides, said polysulfide solution comprising water and at least about 4% by weight of an inorganic polysulfide; and
    (b) an effective amount of a solution with little or no alkali sulfides, said solution comprising at least about 4% by weight of said insecticide, soil fumigant, or mixture thereof,
    wherein at least a portion of said polysulfide solution of step (a) is mixed with said solution of step (b) in the soil.

11. The method of claim 10, wherein said solution of step (b) is an aqueous solution comprising between about 4% and about 54% by weight of a soil fumigant, said fumigant comprising a salt of a dithiocarbamate, and wherein said polysulfide solution of step (a) and said solution of step (b) are applied to the soil as separate solutions.

12. The method of claim 11, wherein the soil fumigant is N-methyldithiocarbamate.

13. The method of claim 10, wherein said polysulfide solution of step (a) and said solution of step (b) are applied at the same time.

14. The method of claim 10, wherein the effective amount of said solution of step (b) is a soil fumigant solution and is an aqueous solution comprising between about 4% and about 54% by weight of a soil fumigant, said fumigant comprising a salt of a dithiocarbamate, and wherein the effective amount of said polysulfide solution of step (a) and the effective amount of said solution of step (b) are applied at the same time.

15. The method of claim 10, wherein the inorganic polysulfide consists essentially of calcium polysulfide, and wherein the soil fumigant consists essentially of an alkali salt of methyldithiocarbamate.

16. The method of claim 10, wherein said polysulfide solution of step (a) and said solution of step (b) are applied to the soil as separate solutions, at a depth of about 2 inches or more below the surface of the soil.

17. The method of claim 16, wherein said solutions of steps (a) and (b) are applied at more than one depth.

18. The method of claim 10, wherein said polysulfide solution of step (a) and said solution of step (b) comprising a soil fumigant are applied as a mixture of the two solutions, wherein said mixture comprises greater than about 8% by weight of calcium polysulfide and greater than about 8% by weight of a salt of metam.

19. A method of controlling soil pathogens in arable soil, said method comprising applying to arable soil:
    (a) an effective amount of a polysulfide solution with little or no alkali sulfides, said polysulfide solution comprising water and between about 4% and about 50% total by weight of one or more inorganic polysulfides; and (b) an effective amount of a solution with little or no alkali sulfides, said second solution comprising at least about 4% by weight of an insecticide, a soil fumigant, or mixture thereof, wherein said solutions of steps (a) and (b) are applied at a predetermined depth in the soil.

20. The method of claim 19, wherein said solutions of steps (a) and (b) are each applied at a first depth between about 2 to about 8 inches subsurface and at a second depth more than about 8 inches subsurface.

\* \* \* \* \*